United States Patent [19]

Jakubowicz

[11] Patent Number: 4,867,616

[45] Date of Patent: Sep. 19, 1989

[54] CUTTING INSERTS AND TOOLS INCLUDING SAME

[75] Inventor: Michael Jakubowicz, Rehov Yizhak Sadeh 34, Tel-Aviv 61 080, Israel

[73] Assignees: Michael Jakubowicz, Ramat Hasharon; A. A. Kidan Cutting Tools, Tel Aviv, both of Israel; part interest to each

[21] Appl. No.: 166,125

[22] Filed: Mar. 9, 1988

[51] Int. Cl.⁴ .............................................. B26D 1/12
[52] U.S. Cl. ...................................... 407/58; 407/113; 407/114
[58] Field of Search ................. 407/58, 113, 114, 115, 407/116

[56] References Cited

U.S. PATENT DOCUMENTS

| | | | |
|---|---|---|---|
| 3,701,187 | 10/1972 | Erkfritz | 407/58 |
| 3,733,664 | 5/1973 | McKelvey | 407/114 |
| 4,180,355 | 12/1979 | Nanini | 407/113 |
| 4,273,480 | 6/1981 | Shirai et al. | 407/114 |

Primary Examiner—Frederick R. Schmidt
Assistant Examiner—Lawrence Cruz
Attorney, Agent, or Firm—Benjamin J. Barish

[57] ABSTRACT

A cutting-tool insert having a cutting edge at the periphery of at least one of its side faces, and a plurality of serrations in the cutting edge. The side faces of the insert are formed with a plurality of recesses between its center and the cutting edge. The plurality of recesses are spaced from each other around the center of the side face, and are also spaced from the serrated cutting edge, to define a margin between the cutting edge and the recesses extending continuously along the length of the cutting edge following the serrations. Also described is a cutting tool using such inserts.

20 Claims, 2 Drawing Sheets

000

CUTTING INSERTS AND TOOLS INCLUDING SAME

BACKGROUND OF THE INVENTION

The present invention relates to cutting inserts, and also to tools, particularly milling tools, using such inserts.

Many types of cutting tools commonly use hard cutting inserts of various configurations having cutting edges at their peripheries for removing the metal. Efforts are continuously being made to increase the productivity of the cutting tool and also to increase the life of the cutting inserts. One way of doing this is to serrate the cutting edges of the inserts, which thereby decreases the power requirement by concentrating the forces at reduced areas along the cutting edge rather than over the complete length of the cutting edge.

BRIEF SUMMARY OF THE INVENTION

An object of the present invention is to provide a cutting-tool insert of the serrated type but of a construction providing a number of advantages over the conventional serrated-edge insert, as will be described more particularly below.

According to the present invention, there is provided a cutting insert having a pair of opposed side faces and a cutting edge at the periphery of at least one of its side faces, and a plurality of serrations in the cutting edge; characterized in that at least one of the side faces of the insert is formed with a plurality of separate recesses between its center and the cutting edge; the plurality of separate recesses being spaced from each other, from the center of the side face, and also from the serrated cutting edge, by non-recessed portions of the insert, and defining a margin between the cutting edge and the recesses extending continuously along the length of the cutting edge following the serrations thereof.

Such a construction provides a number of important advantages.

One important advantage is that the combination of the serrations and the recesses even further decrease the power requirements when using serrations alone. Another advantage is that by having the recesses form a positive angle with respect to the adjoining faces of the margins, the insert may be mounted in a negative position but with an effective rake angle which is positive with respect to the workpiece, thereby providing the advantages of more dense mounting of the inserts characteristic of negative insert positioning, combined with the advantages of producing lower cutting forces and requiring less horse power and less insert strength for the same cut, in comparison with the negative positioning of the inserts. A still further important advantage is that the recesses also serve as chip breakers, and thereby obviate the need for mechanical chip breakers.

The preferred embodiments of the invention described below include additional features which provide further important advantages.

Thus, in the preferred embodiments of the invention described below, the cutting insert is formed with a mounting opening at its center, the plurality of recesses being spaced from each other around the central opening. In addition, the margin is of uniform width for its complete length along the serrated cutting edge. Also, both side faces of the insert are formed with cutting edges around their peripheries, and with a plurality of the recesses between the central mounting opening and the respective cutting edge, thereby defining a margin between the respective cutting edge and the recesses. Further, the portions of the insert on both sides faces between the central opening and the recesses are flat; still further, the margin is slightly recessed on both sides with respect to the respective flat portion of the insert side face, to permit the insert to be mounted on a flat seat with either side face in contact with the flat seat.

A cutting insert constructed in accordance with the foregoing features provides a number of important additional advantages. It enables each instrument to be mounted in a simple manner by merely passing a bolt through its central opening, and obviates the need for cartridges and other arrangements for mounting the inserts. In addition, the insert may be mounted with either flat face in contact with the body seat, thereby enabling the insert to be double-sided; that is, if the insert is of square configuration, it can be provided with 8 cutting edges, rather than with only 4 cutting edges as is common today. Still further, since there is a flat contact between the central non-recessed portions of each insert face with respect to the flat seat, this increases the mechanical stability of the insert and also the dissipation of the heat generated during the cutting operations.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
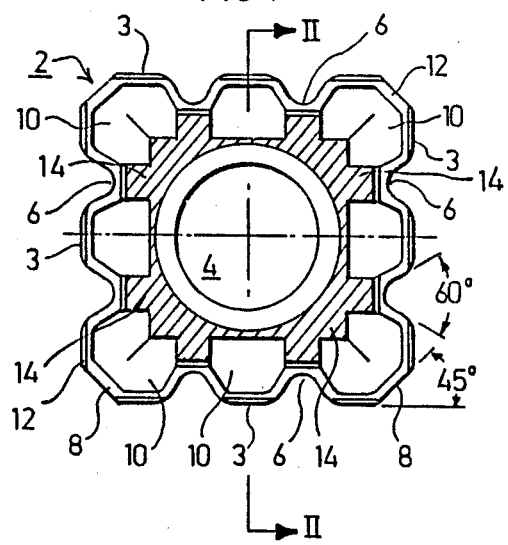
FIG. 1 is a plan view illustrating one form of cutting insert constructed in accordance with the present invention.

For purposes of example, FIG. 1 illustrates a cutting insert, therein generally designated 2, of square configuration, including four equal sizes on each of its two opposite faces. Such an insert thus provides eight cutting edges 3.

The square insert 2 is formed with a central opening 4 for mounting on the cutter body. The illustrated insert is serrated, being formed with two serrations 6 on each of its four sides. The angle of each serration is preferably 60°, and the corners of the four sides are preferably cut at angle of 45°, as shown at 8 in FIG. 1.

Each face of insert 2 is formed with a plurality of recesses 10 spaced from each other around the central opening 4 and also spaced around the four serrated cutting edges 3 on each face of the insert. Recesses 10 thus define a margin 12 between the recesses 10 and each of the cutting edges 3. As shown particularly in FIG. 1 margin 12 extends continuously along the length of the cutting edges 3 and follows the serrations 6; in addition, margin 12 is of uniform width for its complete length.

The portion of each face of the insert between its central opening 4 and the recesses 10, is flat, as shown at 14 in FIG. 1. In addition, the margin 12 is slightly recessed with respect to the flat portion 14; that is, the flat portion 14 extends axially slightly past the margin 12 and the cutting edge 3, so as to serve as the contacting surface when seated in the flat seat of the cutter body. Such a construction enables the insert to be double-sided, since it can be mounted with either face seated against the flat seat of the cutter body; it also increases the mechanical stability of the mounted insert, and further increases the dissipation of the heat generated in the insert during the cutting operation.

Figure 2:
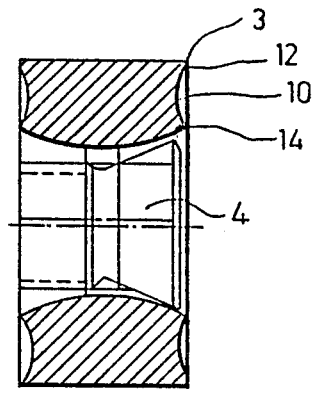
FIG. 2 is a sectional view along the lines II—II of FIG. 1.
Figures 3, 4, 5:
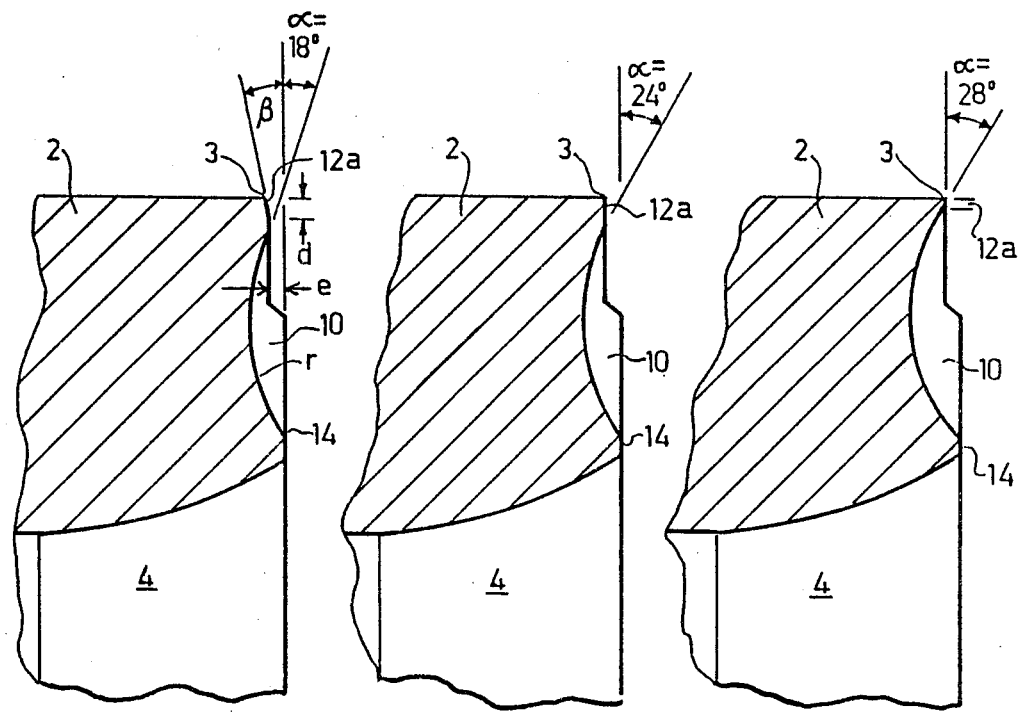
FIG. 3 is an enlarged fragmentary view more clearly illustrating the construction of the insert of FIGS. 1 and 2, the construction illustrated in FIG. 3 being particularly adaptable for use with cast iron and tough steel.
FIGS. 4 and 5 are view corresponding to that of FIG. 3 but illustrating modifications to adapt the insert for use with other metals.

FIG. 2 is a transverse sectional view along the lines II—II of FIG. 1 and illustrates the construction of both faces of the insert provided with the recesses 10; and FIG. 3 more particularly illustrates the construction of this face especially when the insert is to be used for cutting cast iron or tough steel. Thus, as shown in FIG. 3, recesses 10 form an angle "$\alpha$" with respect to the adjoining face of the margin 12, the latter face being indicated as 12a. In addition, the outer face of margin 12 is cut obliquely to the cutting edge 3 at an angle "$\beta$"; this oblique portions of the margin, indicated at 12b, is called the K-land and has a length "d". The face of recess 10, indicated at 14a in FIG. 3, adjoining the flat portion 14 of the insert is curved according to a radius of curvature "r"; and the amount that the flat face 14 projects from margin 12 is indicated at "e". In the example illustrated in FIG. 3, wherein the insert is adapted particularly for cutting cast iron or tough steel, the above parameters may be as follows: $\alpha = 18°$; $\beta = +20°$; $r = 1.50$; $d = 0.25$; and $e = 0.12$.

FIG. 4 illustrates the construction of the insert particularly for cast steel. In this case, angle $\alpha$ would be larger, namely 24°; and FIG. 5 illustrates the construction where the insert is designed for cutting aluminum or soft steel, in which case the angle "$\alpha$" would be even larger, namely 28°.

Figure 6:
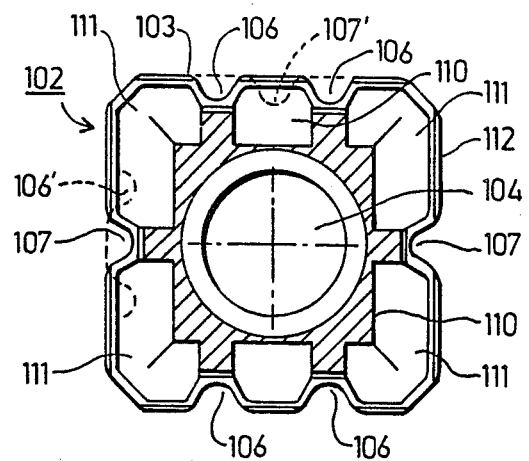
FIG. 6 illustrates another variation in the construction of the insert of FIG. 1.

FIG. 6 illustrates another insert, therein designated 102, constructed as described above with respect to FIG. 1 but with a slightly different arrangement of serrations between its serrated cutting edge 103 and its center openings 104. In the construction illustrated in FIG. 6, on one face, two serrations 106 are provided on each of the two opposite sides of the insert, and only one serrration 107 is provided on the remaining two opposite sides; whereas on the opposite face, the reverse is true as shown by the broken lines 106' and 107' respectively. In faces, as in FIG. 1, each recess extends only for the length of the cutting edge between serrrations so that the margin 112 between the recesses and the cutting edges will be continuous, of uniform width, and coextensive with the serrated cutting edge. Accordingly, in the arrangement illustrated in FIG. 6, on each face there is one distinct recess 110 in each of the two opposite sides of the insert, and larger recesses 111 at the corners and extending to the mid-portion of the remaining two sides of the insert, coextensive with the cutting edges in the respective sides of the insert.

Figure 7:
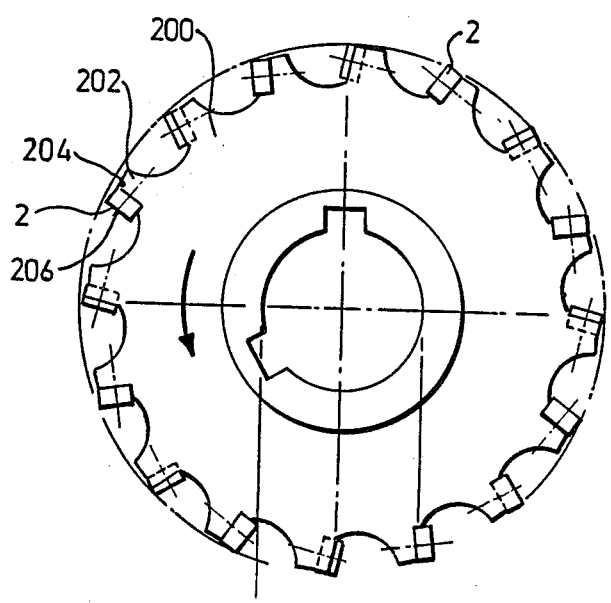
FIG. 7 and 8 are side and end views, respectively, illustrating a solid disc milling cutter equipped with the inserts of FIGS. 1–6.
Figure 8:
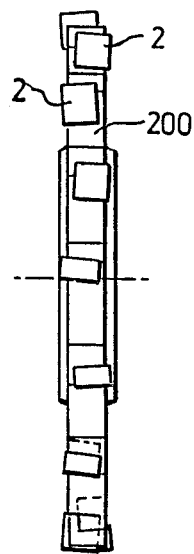

FIG. 7 and 8 illustrate one manner of mounting the above-described inserts in a milling cutter including a solid circular body or disc 200 formed with a circular array of teeth 202 each formed with a flat seat 204. Each insert is mounted to the flat seat of its respective tooth by a holt 206 passing through the center opening of the insert. Each insert is mounted at a negative angle "$\alpha$" but the angle "$\alpha$" formed by the face of the recesses (10 FIG. 1) adjoining the margin 12 is a positive angle greater than the negative mounting angle of the insert. Accordingly, the effective rake angle of the mounted insert can be made positive, even though the insert is mounted negatively. In the example illustrated in FIGS. 6 and 7, there are 16 inserts 2 and each is mounted at a negative angle of 14°, so that when the construction illustrated in the FIG. 3 is used ($\alpha = 18°$), there will be produced an effective rake angle which is $+4°$; this is particularly suitable for cutting cast iron or tough steel.

On the other hand, when the construction of FIG. 4 is used, wherein $\alpha = 24°$, there will be produced an effective rake angle of $+10°$, which is particularly suitable for cutting cast steel. If the insert illustrated in FIG. 5 is used, wherein $\alpha = 28°$, there will be produced an effective rake angle of $+14°$, which is particularly suitable for cutting aluminum or soft steel.

As shown in FIG. 8, the inserts 2 are mounted in alternately staggered relationship, so that a cutting edge of one will be aligned with a serration of the next one. This overlapping of adjacent inserts reduces the specific resistance to milling and enables reducing the specific cutting force.

It will thus be seen that the inserts may be mounted in a negative manner on the cutting body in order to permit more close spacing of the inserts, characteristic of negatively-mounted inserts; but at the same time, the inserts will exhibit positive-mounting characteristics of lower cutting forces, less required horsepower, and less required insert strength, thereby providing more efficient cutting action.

For example, it is generally recognized that a positive rake angle decreases the power requirements by about 1.3% per degree. Accordingly, providing a positive rake angle of 10–15% as proposed above can reduce the power requirements approximately 13–20%.

In addition, this arrangement permits more inserts to be mounted in a cutting body of a given diameter. Increasing the number of inserts increases the productivity of the equipment. In addition, the novel inserts can be used with smaller diameter cutting tools, for example with end mills, and also with porcupine cutters.

While the invention has been described with respect to an insert of square shape, it will be appreciated that the invention can be used with inserts of other shapes. Many other variations, modifications and applications of the invention will be apparent.

What is claimed is:

1. A cutting insert having a pair of opposed side faces and a cutting edge at the periphery of at least one of its side faces, and a plurality of serrations in said cutting edge; characterized in that said one side face of the insert is formed with a plurality of separate recesses between the center of the insert and said cutting edge; said plurality of separate recesses being spaced from each other; from the center of said one side face, and also from said cutting edge, by non-recessed portions of the insert, and defining a margin between the cutting edge and the recesses extending continuously along the length of the cutting edge following the serrations thereof.

2. The insert according to claim 1, wherein the insert is formed with a central mounting opening, said plurality of separate recesses being spaced from each other around said central mounting opening.

3. The insert according to claim 2, wherein said margin is of uniform width for its complete length along the cutting edge formed with the serrations.

4. The insert according to claim 2, wherein each of said recesses forms an angle of 15-35 degrees with respect to said margin.

5. The insert according to claim 2, wherein the non-recessed portion of said side face between the central opening and the separate recesses is flat.

6. The insert according to claim 2, wherein both side faces of the insert are formed with cuting edges around their peripheries, and with a plurality of said separate recesses between the central mounting opening and the respective cutting edge spaced by non-recessed portions and defining a said margin between the respective cutting edge and the recesses.

7. The insert according to claim 6, wherein the non-recessed portions of the insert on both sides faces between the central opening and the recesses are flat.

8. The insert according to claim 7, wherein said margin is slightly recessed on both sides with respect to the respective flat portion of the insert side face, to permit the insert to be mounted on a flat seat with either side face in flat contact with the flat seat.

9. The insert according to claim 1, wherein said insert is of polygonal configuration and is formed along each of its sides with a said cutting edge, a plurality of said recesses, and a said margin between the respective cutting edge and the recesses.

10. The insert according to claim 9, wherein said insert is of square configuration.

11. The insert according to claim 9, wherein said insert is formed with a separate recess at each corner and with at least one recess at each of its sides.

12. The insert according to claim 9, wherein said insert is formed with a recess in each corner, and with a single recess at some or all of its sides.

13. The insert according to claim 1, wherein each of said recesses forms an angle of 18° with respect to the adjoining face of said margin.

14. The insert according to claim 1, wherein each of said recesses forms an angle of 24° with respect to the adjoining face of said margin.

15. The insert according to claim 1, wherein each of said recesses forms an angle of 28° with respect to the adjoining face of said margin.

16. A cutting tool for removing material from a workpiece, comprising: a circular body formed with a plurality of seats around its circumference; and an insert mounted in each of said seats; each of said inserts having a pair of opposed side faces and a cutting edge at the periphery of at least one of its side faces, and a plurality of serrations in said cutting edge; said one side face of the insert being formed with a plurality of separate recesses between the center of the insert and said cutting edge; said plurality of separate recesses being spaced from each other; from the center of the side face of the insert, and also from said cutting edge, by non-received portions of the insert and defining a margin between the cutting edge and the recesses extending continuously along the length of the cutting edge following the serrations thereof; said inserts being mounted in a negative position to define a predetermined negative angle with respect to the workpiece; each of said recesses formed in the insert defining, with respect to the margin of the insert, a positive recess angle which is greater than said predetermined negative angle, such that the effective rake angle of the insert with respect to the workpiece is positive.

17. The cutting tool according to claim 16, wherein the mounted position of the inserts defines a rake angle of $-14°$, and the recess angle is $+18°$, whereby the insert defines an effective rake angle of $+4°$ with respect to the workpiece.

18. The cutting tool according to claim 16, wherein the mounted position of the inserts defines a rake angle of $-14°$, and the recess angle is $+24°$, whereby the insert defines an effective rake angle of $+10°$.

19. The cutting tool according to claim 16, wherein the mounted position of the inserts defines a rake angle of $-14°$, and the recess angle is $+28°$, thereby defining an effective rake angle of $+14°$.

20. A cutting tool for removing material from a workpiece comprising a circular body formed with a plurality of seats around its circumference, and an insert mounted in each of said seats; each of said inserts having a pair of opposed side faces and a cutting edge at the periphery of at least one of its side faces, and a plurality of serrations in said cutting edge; said one side face of the insert being formed with a plurality of separate recesses between the center of the insert and said cutting edge; said plurality of separate recesses being spaced from each other; from the center of the side face of the insert, and also from said cutting edge, by non-recessed portions of the insert and defining a margin of uniform width between the cutting edge and the recesses extending continuously along the length of the cutting edge following the serrations thereof; each of said inserts being mounted directly to a body seat by a bolt passing through a central opening in the insert and into the body seat.

* * * * *